Dec. 12, 1967  L. E. HANSEN  3,357,259
AUTOMOBILE WHEEL BALANCER
Filed Feb. 8, 1965  2 Sheets-Sheet 1
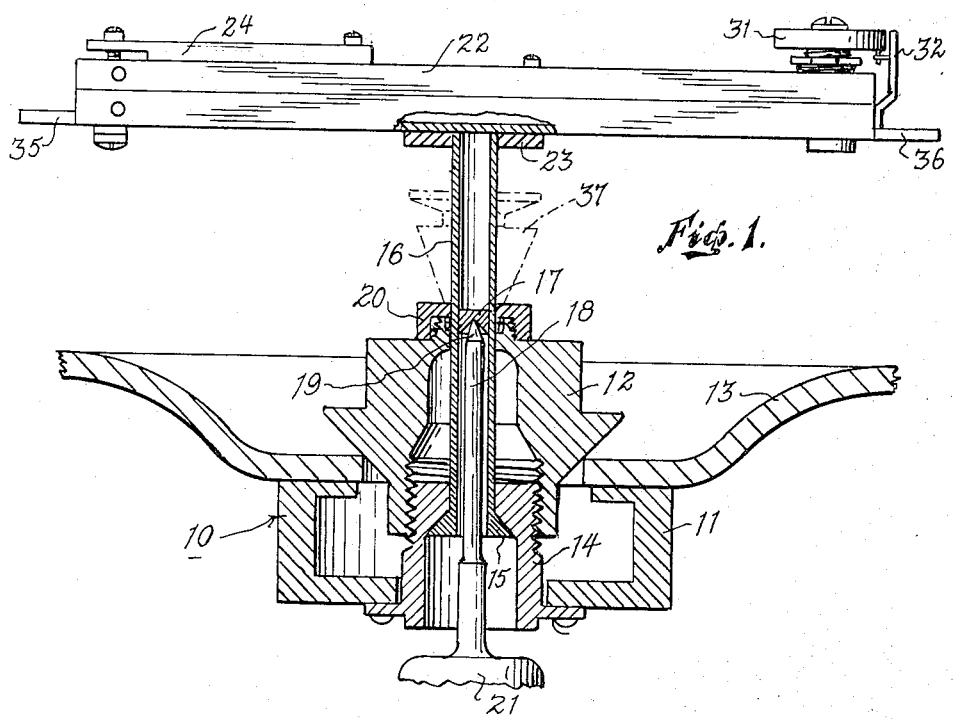
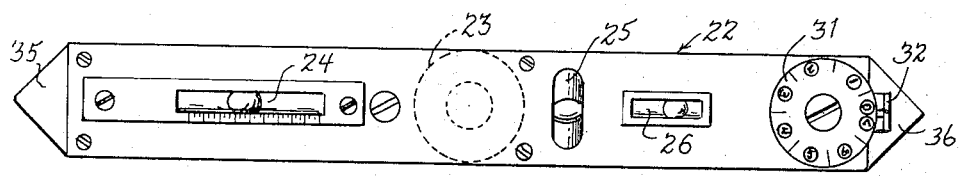
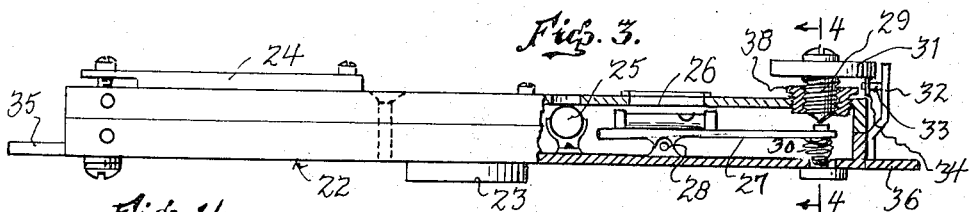
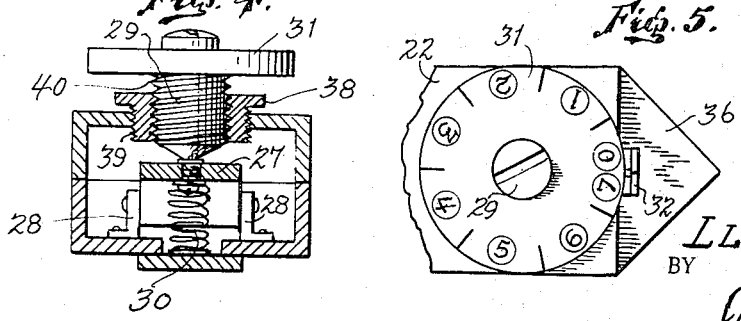
INVENTOR.
LLOYD E. HANSEN
BY
W. H. Atkinson
Attorney Fig. 6.
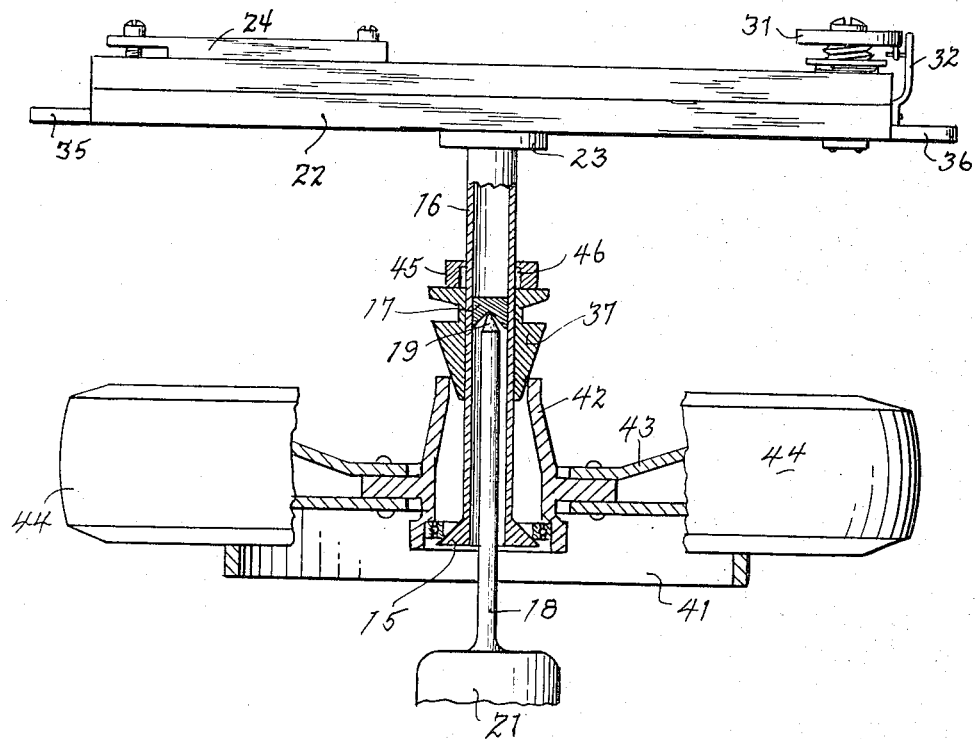
INVENTOR.
LLOYD E. HANSEN.
BY
ATTORNEY

United States Patent Office 3,357,259
Patented Dec. 12, 1967

3,357,259
AUTOMOBILE WHEEL BALANCER
Lloyd E. Hansen, 210 Seville Way,
San Mateo, Calif. 94402
Filed Feb. 8, 1965, Ser. No. 431,086
2 Claims. (Cl. 73—484)

ABSTRACT OF THE DISCLOSURE

This invention comprises a support having a vertically extending spindle over which a wheel either with or without a tire is balanced at its center upon a spindle engaging member that carries an upwardly extending tubular member which serves as a support for an elongated spirit level carrying means which has a transverse and longitudinally extending air bubble spirit level by which the inclination of the leveling member may be determined. The transversely extending spirit level serves to position the elongated spirit level carrying member in line with the plane in which the wheel appears to be out of balance, and when the longitudinally extending air bubble is brought to a balance the wheel will be in a balanced condition. In this operation the wheel will be roughly brought into a balanced condition where the longitudinally extending spirit level will become operative for a rough setting and to complete the balancing of the wheel the longitudinally extending spirit level will then be adjusted by a micrometric adjusting means that will indicate the amount of such small additional weight as will be required to obtain a true balance of the wheel.

---

This invention relates to wheel-balancing machines, especially for the balancing of automobile and truck wheels when removed from the vehicle. The principles of the invention are applicable, of course, to the balancing of other rotatable bodies, but reference herein will be had to vehicle wheels.

Many types of wheel balancing machines in present use are operated in such a way that various weights must be added to the wheel being checked and the wheel rotated to ascertain the effect of the added weight. The process is often repeated several times on a single wheel, the position and mass of the weight being changed until the required results are obtained. The operation is time consuming and entails a considerable amount of trial and error. It is therefore the purpose of this invention to provide a wheel balancing means which will reduce the balancing of a wheel to a single operation.

The primary object of my invention is to provide a static wheel balancing means by which the amount of weight and the proper position thereof at the circumference of a wheel to produce a balance is determined by a novel spirit level device that can be employed in a speedy, simple and accurate manner without rotation of the wheel during the operation.

Another object of the invention is to provide a static wheel balancing means that is adapted for use upon automobile and other type wheels equipped with or without the conventional bearing supporting hub.

A further object of the invention is to provide a spirit level device for determining the weight value and the proper location of the weight upon a wheel that is being balanced on a central supporting spindle as employed in most static wheel balancing devices.

Other objects and advantages will be in part evident to those skilled in the art and in part pointed out hereinafter in connection with the accompanying drawing, wherein there is shown by way of illustration and not of limitation a preferred embodiment of the invention.

In the drawing wherein like numerals refer to like parts throughout the several views:

FIGURE 1 is a side elevation partially in section showing the invention as employed in balancing a vehicle wheel, FIGURE 2 is a top view of a spirit level device as employed in my invention, FIGURE 3 is the side view of the level of FIGURE 2 with a portion broken away and in section to reveal details of construction, FIGURE 4 is a transverse sectional view taken along line 4—4 of FIGURE 3, FIGURE 5 is an enlarged fragmentary view of the level as shown in FIGURE 2, and FIGURE 6 is a view similar to FIGURE 1 showing my invention as employed with a wheel having a bearing hub and brake drum.

For a better and more detailed description of the invention, reference is now made to the accompanied drawings wherein the numeral 10 designates generally a wheel supporting assembly consisting of a supporting base 11 and an inverted vertically adjustable conical plug 12, which is disposed so that when a wheel, here designated by the number 13, is placed upon base 11 it will operate to center the wheel thereupon as indicated in FIGURE 1 of the drawings. In this showing the conical plug member 12 is threaded upon a centrally disposed upstanding cylindrical extension 14 carried by the wheel supporting member 11. This upstanding extension 14 carried by the wheel supporting member 11 has a conical seat into which an enlarged head 15 at the lower end of a tubular level supporting member 16 is seated and located within this tubular level supporting member 16 at a point above the center of gravity of the wheel supporting base 11 and a wheel thereupon, the level supporting member 16 has an inverted cup-like centering bearing 17 into which a pointed pivot forming end 19 at the upper end of a vertical spindle 18 engages. As a means for centering the tubular level supporting member 16 accurately at the center of the wheel supporting base 11 the conical plug member 12 carries a threaded clamping collar 20. With its centering action this collar 20 will also serve to secure the tubular level supporting member 16 in fixed position with respect to the wheel supporting base member 11. The vertical pivot forming spindle 18 is here shown as carried by a supporting base or foundation 21. At this point it should be understood that the tubular level supporting member 16 is machined at its upper end so that when a level supporting device, here designated by the numeral 22, is positioned thereupon as indicated in FIGURE 1, it will extend in true parallel relation with the wheel engaging upper surface of the supporting base member 11. At this point it will be noted that the level supporting device 22 has a ring-like boss 23 at its underside with a central opening or bore that will fit snugly over the end of the tubular level supporting member 16 when in operation and also a complete removal of the level supporting device 22 to permit the positioning of a wheel 13 to be balanced upon the assembly for a balancing operation.

Reference is now made to FIGURES 2 and 3, of the drawings for description of a spirit level aspect of the invention. As indicated in these figures the level supporting device 22 is of elongated rectangular box-like construction with the ring-like boss 23 located substantially midway between the ends thereof. Mounted within the box-like supporting device 22 and to the left of its center as here shown there is a spirit level 24 that will operate to indicate when the device 22 is disposed throughout its length in a truly horizontal plane. Therefore by rotating the device 22 about the axis of the support 16 it will be possible to determine the manner and in what direction the plane of the wheel is inclined should it be out of balance. This spirit level 24 will be particularly useful when the wheel is in true balance and will not require the addition of any balancing weights as practiced in the art of wheel balancing with device of the character here involved. However to indicate any degree of unbalance as indicated by the spirit level 24, I have shown a graduated scale that is related to the bubble and which will be found useful as an indication of the degree or direction of unbalance when the condition of the wheel is approaching a true balance. In addition to the spirit level 24 the level supporting device 22 also carries a spirit level 25, here shown as located to the right of the tubular supporting member 16 and which extends transversely of the supporting device 22 and consequently tangent to the axis of the tubular level supporting member 16. Outwardly with respect to this spirit level 25 the supporting member 22 also carries an additional spirit level 26 that extends radially with respect to the axis of the tubular supporting member 16. These spirit levels 24, 25 and 26 are exposed to view through openings at the top of the supporting device 22 as shown in FIGURE 1. The spirit level 26 is here shown as mounted upon a platform 27 that is pivotably mounted between supporting ears 28 and has a portion at one side of its pivotal point extended into the path of a vertically adjustable screw 29 against which it is biased by a coiled spring 30. The screw 29 is also here shown as having a disc 31 which carries calibrations or indicia that is related to a pointer 32 carried by the level supporting device 22. As indicated in FIGURE 3, this pointer 32 is provided with an inwardly extending stop 33 against which a pin 34 carried by the disc 31 will engage as it is turned through its substantially 360° of movement. While it will be seen that the direction of the longitudinal axis of the level supporting device 22 will indicate the plane in which the high and low points of the wheel being balanced appear, to suggest this fact to the user the device 22 is provided with indicating pointers 35 and 36 at its ends. In FIGURE 1 of the drawings the dot and dash outline 37 relates to a modifying accessory which will be particularly referred to in the description of FIGURE 6 of the drawings.

Upon referring to FIGURE 4 of the drawings it will be seen that the screw 29 is threaded through a collar 38 having relatively finer threads 39 than are the threads 40 of the screw 29 and therefore by properly adjusting the collar 38 upon the level supporting device 22 the screw 29 with its disc 31 can be properly located to adjust the spirit level 26 from its extreme incline position as shown in the drawing to a position normal with the plane of the level supporting device 22. In this adjustment from the position indicated to a normal and level position the disc 31 will turn clockwise until the pin 34 carried thereby comes into engagement with the other side of the stop 33 and thus brings the 0 indicia thereupon into register with the pointer 32.

In FIGURE 6 of the drawings there is shown a modified arrangement for use in balancing a wheel of the type having a brake drum 41 and a shaft bearing accommodating hub 42. The wheel here designated by the numeral 43 has a tire 44. In this showing the cone 37, as indicated by dot and dash lines in FIGURE 1, is slideably mounted upon the tubular level supporting member 16 and operates in a manner similar to that of the cone member 12 which, as described above, cooperates with the wheel supporting member 10 to center a wheel thereupon. As here illustrated the wheel support 10 has been omitted and the coned end 15 of the tubular level support 16 is here employed to support the wheel upon the spindle 18. When the coned member 37 is moved downwardly into contact with the top of the hub 42 of the wheel it will operate to secure the wheel centrally upon the tubular level support 16. With the wheel 43 thus centered upon the tubular level support 16 and the latter is positioned upon the spindle 18 the wheel will be free to assume a balance or unbalanced position within the limits provided. In order to provide a clamping pressure upon the wheel hub 42 when the cone 37 is brought into engagement with the hub 42 of the wheel I have provided a friction-type collar 45 having an inner expansion ring or bushing 46 that will serve when turned to fix the collar 45 upon the level supporting member 16 in much the same fashion as if this collar 45 were threaded upon the member 16. When the wheel 43 is thus mounted and the level supporting member 22 is positioned upon the tubular supporting member 16 the balancing operation will be carried out in a manner similar to that as contemplated by the arrangement illustrated in FIGURE 1 of drawing.

While the operation of my invention should be understood from the above description it is pointed out that in situations where a wheel to be balanced is found to be in an extreme unbalanced condition the wheel may need to be roughly balanced in a preliminary manner in order to bring it into the range of the spirit levels carried by the level supporting member 22. Then as a final adjustment in the balance of the wheel the level supporting member 22 will be turned about the axis of the wheel until the tangentially disposed spirit level 25 has been brought into a level condition which should be in a plane transverse to the vertical plane in which the wheel shows the maximum unbalance. In other words the level supporting member 22 will then be positioned in the vertical plane in which the wheel shows the maximum condition by unbalance. Therefore when this occurs the pointed end 35 of the level support 22 will indicate the highest point of the wheel while the pointer 36 will indicate the low point of the wheel. Now to finally balance the wheel the operator will apply such weight at the high point as I indicated by the indicia upon the disc 31 with respect to the pointer 32 associated therewith.

In a typical wheel balancing operation the operator, after mounting the wheel upon the support 11 and the level supporting device upon the level supporting member 16, he will add such weights to the wheel at the highest point thereof as indicated by the level 24. During this step the transverse level 25 will be in balance as it will extend perpendicular to the plane in which the level supporting member is disposed. Unlike the level 24, the spirit level 26 is extremely sensitive and while the spirit level 24 might indicate a balance during this preliminary operation, it may be found that some additional weight will be required within established limits, and if the spirit level 26 indicates a need for more weight, the amount of this weight will be determined by turning of the calibrated disc 31 until the spirit level 26 is in true balance. Following this the indicia upon the calibrated disc 31 will indicate the amount of additional weight either in ounces or grams as will be determined by the calibrations carried thereby. A feature of the invention is that the wheel supporting member is adapted for the mounting of a wheel without hub or brake band as shown in FIG. 1, or with a hub as shown in FIG. 6 by the omission of some of the otherwise required wheel supporting means.

While I have, for the sake of clearness and in order to disclose my invention so that the same can be readily understood, described and illustrated specific forms and arrangements, I desire to have it understood that this invention is not limited to the specific forms disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a static wheel balancing device, the combination of a stationary vertically extending spindle, a wheel supporting means balanced upon said spindle having an upstanding centrally disposed tubular shaft with an internal cup bearing above the plane of a wheel carried thereupon with which the upper end of said spindle engages, an elongated laterally extending spirit level supporting means mounted at its center upon the upper end of the tubular shaft of said wheel supporting means for relative rotation in a plane parallel to the plane of a wheel upon said support, a first tangentially disposed spirit level carried by said level supporting means in a plane perpendicular to the axis of said level supporting means, a second radially extending spirit level at one end of said supporting means having an axis at a right angle to said first spirit level and operable to obtain an initial balance of a wheel, a third coaxially aligned radially extending spirit level carried by said level supporting means adapted and arranged to indicate the point where a further lack of weight may still cause an unbalance in a wheel being balanced, means for adjusting the inclination of said third spirit level upon said level supporting means to a level position, and a calibrated scale carried by said last means for indicating the weight to be added at an indicated point as determined by said first tangentially disposed spirit level to establish a true balance in the wheel.

2. In a wheel balancing device of the character having a wheel centering support mounted upon a centrally disposed pivotal bearing operating to support the wheel to be balanced in a plane as determined by the condition of balance or unbalance present in the wheel, the combination of a centrally and upwardly extending level supporting member carried by said wheel centering support, an elongated laterally extending spirit level carrying means upon said level supporting member having a first spirit level disposed in a horizontal plane at a right angle to the axis of said wheel centering support operating to indicate when said laterally extending level supporting member is in line with the vertical plane in which the wheel shows the greatest state of unbalance, a second spirit level at one end of said level supporting means extending radially with respect to the axis of the wheel for establishing a preliminary balance, a third spirit level having an axis perpendicular to the axis of said first spirit level and disposed outwardly at the other end of said supporting means in coaxial alignment with said second spirit level and extending radially in the vertical plane as indicated by said first spirit level, means for adjusting said third spirit level independently of said second spirit level to a level position independently of said first and second spirit levels, and means carrying a calibrated indicating scale associated and arranged to indicate in conjunction with said first spirit level the point and the amount of any additional weight required to establish a true balance in a wheel carried by said wheel supporting member.

References Cited
UNITED STATES PATENTS

| | | | |
|---|---|---|---|
| 2,075,421 | 3/1937 | Bennett | 73—484 |
| 2,298,656 | 10/1942 | Smith | 73—459 |
| 2,747,411 | 5/1956 | Lannen | 73—483 |

JAMES J. GILL, *Primary Examiner.*